United States Patent

[11] 3,577,789

| [72] | Inventor | Claude Sansam<br>P.O. Box 235, North Land O'Lakes, Wis. 54540 |
|---|---|---|
| [21] | Appl. No. | 808,549 |
| [22] | Filed | Mar. 19, 1969 |
| [45] | Patented | May 4, 1971 |

[54] POWER TAKEOFF ACTUATOR
9 Claims, 3 Drawing Figs.
[52] U.S. Cl. .................................................... 74/11,
74/105, 74/335
[51] Int. Cl. .....................................................F16h37/100,
F16h 21/44, F16h 5/06
[50] Field of Search .......................................... 74/11, 335, 105, 102

[56] References Cited
UNITED STATES PATENTS

| 2,034,400 | 3/1936 | Kesling | 74/335 |
| 2,634,622 | 4/1953 | Cripe | 74/335 |
| 3,277,734 | 10/1966 | Bernard | 74/335 |

*Primary Examiner*—Leonard H. Gerin
*Attorneys*—Phillip L. De Arment and James G. O'Boyle

ABSTRACT: The apparatus includes a rotary reversible electric motor which is energized by the electrical system of a vehicle. The motor has an oscillatable output shaft which carries a radially extending link having an opening in its outer end. A translatable link transmits power between the shaft and a shiftable lever of the power takeoff unit which accomplishes engagement and disengagement of the takeoff unit. The translatable link either rigid or flexible has oppositely offset end portions which engage openings in the radially extending link and shift lever to effect a connection therebetween.

Patented May 4, 1971 3,577,789

INVENTOR.
CLAUDE SANSAM

ATTORNEY

INVENTOR.
CLAUDE SANSAM
BY
*Phillip L. DeArment*
ATTORNEY

POWER TAKEOFF ACTUATOR

The present invention relates to an actuator for a power takeoff mechanism and more particularly to a self-contained actuator which can be readily attached to the housing of a power takeoff mechanism or frame of a vehicle.

The need exists for a power takeoff actuator which is relatively simple in construction, reliable in operation and relatively inexpensive to manufacture. The device according to the present invention satisfies these basic needs by providing a self-contained actuator which utilizes a simple, but effective positive mechanical linkage reversibly driven by an electric motor powered from the electrical system of a vehicle. The actuator is of a compact design which lends it readily attachable to housings of various power takeoff mechanisms or to vehicle's frames.

Preferred embodiments of the invention are illustrated on the accompanying drawings, and in which.

Figure 1:
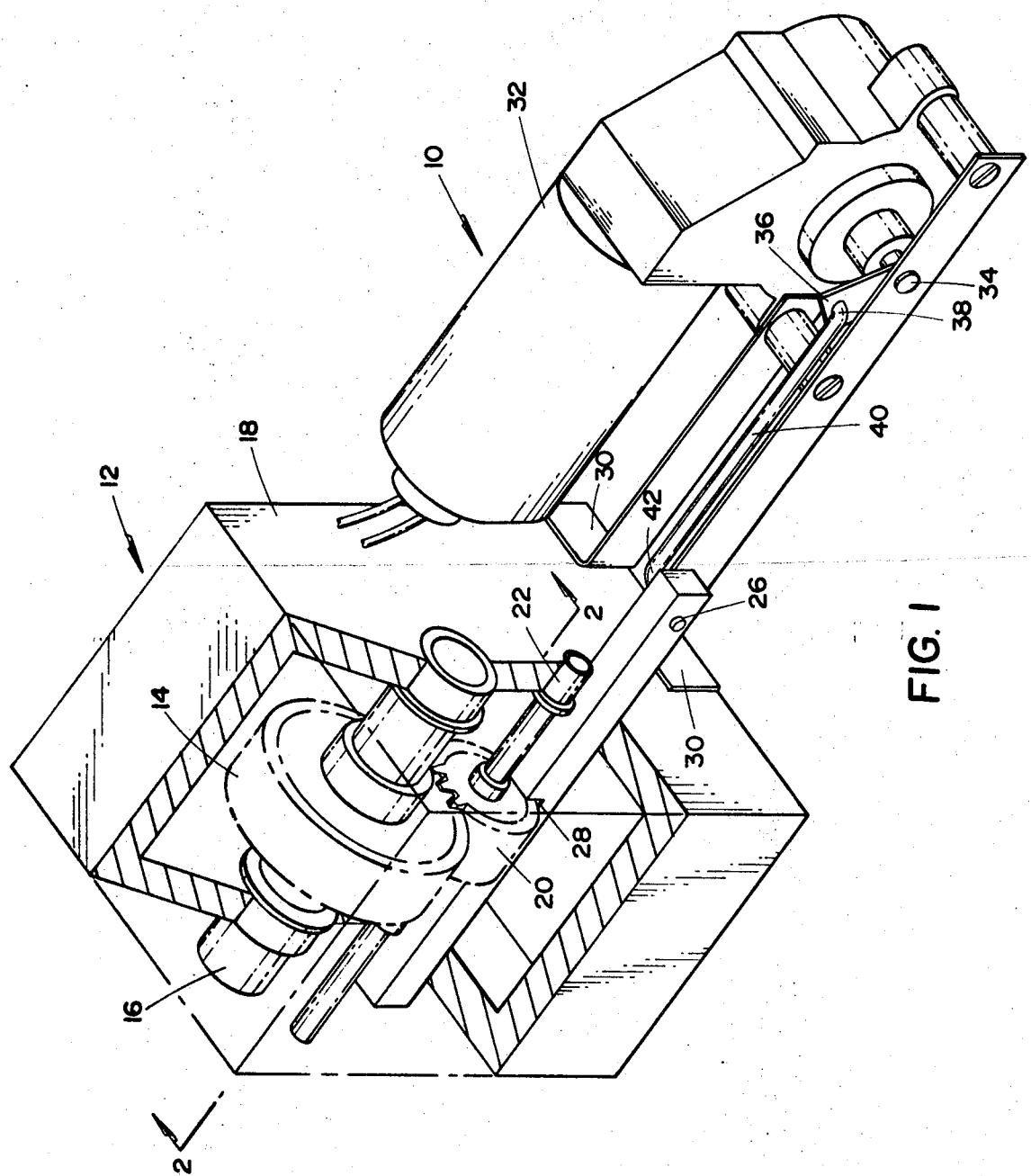
FIG. 1, is a perspective view with parts broken away of a representative power takeoff mechanism and actuator therefor according to the present invention.

Referring to the drawings and initially to FIG. 1 which illustrates a preferred actuator embodiment 10 mounted in operative relationship with a power takeoff mechanism 12. The power takeoff mechanism 12 illustrated is one type of takeoff device which the actuator according to the present invention may be used. The takeoff mechanism 12 is of the type associated with tractor-type vehicles and utilized for selectively transmitting power from the tractor engine to an implement associated with the tractor such as a material handling mechanism.

The power takeoff mechanism 12 has a drive gear 14 driven from a drive shaft 16 which is supported by suitable bearings in housing 18. The shaft 16 may be driven from the main power transmission system of the associated vehicle. Thus, power may be continually directed to drive gear 14 and the power is selectively taken from gear 14 by a shiftable takeoff gear 20.

Gear 20 is mounted on a shaft 22 which is supported for rotation by bearings provided in housing 18. The takeoff gear 20 may be connected to shaft 22 by a spline connection to permit gear 20 to be shifted into and out of engagement with drive gear 14 by moving relative to shaft 22. Shaft 22 is connected to drive an implement when gear 20 is shifted into meshing engagement with drive gear 14.

Gear 20 is shifted along shaft 22 by a shift member 26 which is supported for translation by housing 18. Member 26 has a cutout area 28 through which a portion of gear 28 passes. There is clearance between gear 14 and the horizontal portion of cutout area 28 but the vertical wall portions of area 28 selectively engage opposite sides of gear 20 to shift gear 20 into and out of mesh with gear 14. Member 18 is selectively shifted by actuator 10.

Actuator 10 is a relatively compact unit that can be attached to housing 18 by suitable brackets such as brackets 30. The actuator 10 includes an electric motor 32 which can be energized by the electrical system of a vehicle with a switch (not shown) located convenient to the operator.

The illustrated motor 10 is a rotary, reversible-type electrical motor. The rotor shaft has a worm gear at the outer end that moves in opposite directions depending on how the switch is thrown. Associated with the worm gear is a meshing bull gear which transmits the oscillatory movement of the rotor shaft to an output shaft 34 rotated by the bull gear. Output shaft 34 oscillates either in one direction or another depending on the direction of rotation of the bull gear.

Figure 2:
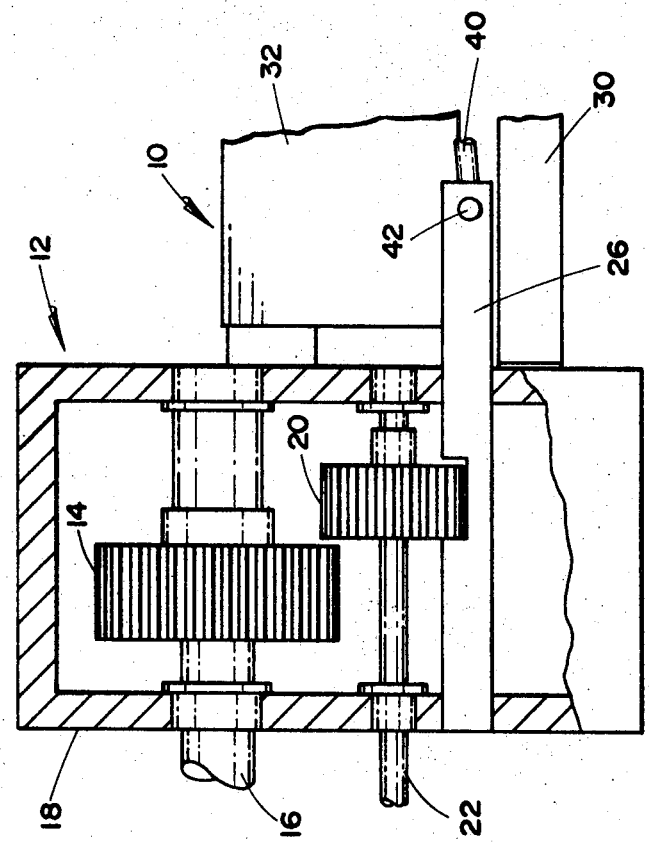
FIG. 2, is a partial sectional view of the device shown in FIG. 1 taken approximately along lines 2-2 of FIG. 1.

In the actuator embodiment shown in FIG. 1 and 2, a lever 36 extends radially from shaft 34 and is connected to oscillate with shaft 34. The end portion of lever 36 has an opening which receives an offset end portion 38 of a translatable link member 40 to provide a power transmitting connection therebetween. The opposite end of link member 40 has a second offset end portion 42 which is offset from the body portion in a direction opposite offset portion 38. Offset end portion 42 engages an opening in the end of shift lever 26 to provide a connection therebetween.

In view of the foregoing, it should be apparent that moving the switch (not shown) in one direction connects motor 32 to the electrical system of an associated vehicle and rotates the rotor shaft in one direction of rotation. This imparts a counter rotation to lever 36 through shaft 34. When lever 36 translates link member 40 and connected shift lever 26 to the right as viewed in FIG. 1, takeoff gear 20 is shifted out of mesh with drive gear 14 or from the position shown in FIG. 1 to the position illustrated in FIG. 2. When gears 14 and 20 assume this position, no power is transmitted by shaft 22.

By reversing the switch, the actuator 10 operates in reverse to shift gear 20 along shaft 22 into mesh with drive gear 14. In this condition, power is transmitted from shaft 16 to shaft 22.

Figure 3:
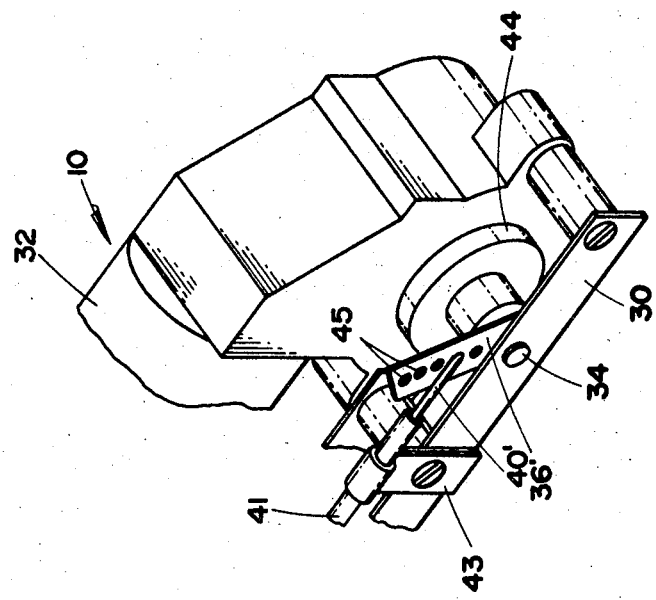
FIG. 3, is partial perspective view showing a modified form of the actuator according to the present invention.

A modification of actuator 10 is shown in FIG. 3. In this embodiment, a flexible translating link 40' is employed. The flexible link 40' is used where obstacles associated with the vehicle or power takeoff unit prevents using the rigid translator link 40.

The flexible link 40' comprises a flexible housing 41 through which flexible link 40' reciprocates. The housing is held against translation by suitable clamps such as clamp 43. The ends of line 40' are offset and are received in one of the openings 45 in member 36' and in a suitable opening provided in the outboard end of shift lever 26. It should be apparent that the line 40' and housing 41 can be bent around obstacles and still permit translation of link 40' relative to housing 41 to shift lever 26.

The arrangement of motor 32, shaft 34 and link member 40 provides a compact and positive mechanical actuator for operating the power takeoff mechanism 12. Specifically, by arranging the longitudinal axes of motor 32 and translating link 40 parallel and output shaft 34 transverse thereto along with changing the motion from rotary to reciprocating provides a unit of compact size, positive in operation and readily attachable to a suitable support by brackets 30.

Various modificating of the present invention will occur to those skilled in the art and it is intended to cover those changes that come within the scope of the appended claims. For example, actuator 10 could be used to shift a pivoted lever which in turn shifts a takeoff gear relative to a drive gear through, for example, a forked member engaging the shiftable gear. A further example of a change considered to some within the scope of the appended claims is to eliminate the radially extending lever and connect the translatable link directly to the bushing on the output shaft of the motor.

I claim:

1. An apparatus for actuating a power takeoff mechanism comprising a reversible motor energizable by an electrical system of a vehicle, said motor having an oscillatable output shaft, linkage means for transmitting power between said shaft and the power takeoff mechanism, said linkage means including an oscillatable part connected to said shaft and a translatable part connected to said oscillatable part and to the power takeoff unit to engage the power takeoff unit when said translatable part is moved in one direction and to disengage the power takeoff unit when moved in the opposite direction, wherein the longitudinal axis of said output shaft extends generally transversely of the longitudinal axes of said motor and said translatable part.

2. An apparatus for actuating a power takeoff mechanism comprising a reversible motor energizable by an electrical system of a vehicle, said motor having an oscillatable output shaft, linkage means for transmitting power between said shaft and the power takeoff mechanism, said linkage means including an oscillatable part connected to said shaft and a translatable part connected to said oscillatable part and to the power takeoff unit to engage the power takeoff unit when said translatable part is moved in one direction and to disengage the power takeoff unit when moved in the opposite direction, wherein said translatable part is a flexible member.

3. An apparatus for engaging and disengaging a power takeoff mechanism comprising a reversible motor having an oscillatable output member, shiftable lever means operatively connected to shift the power takeoff mechanism between engaged and disengaged conditions, translatable means connected at one end to said output member and at the opposite end to said lever means and operative to transmit power between said output member and said shiftable lever, and means supporting said apparatus so that the longitudinal axes of said motor and translatable means are parallel and at least a portion of said output member extends transversely thereto.

4. An apparatus as defined in claim 3, wherein said translatable means includes a flexible reciprocable member.

5. An apparatus as defined in claim 4, wherein said shiftable lever means has an opening in one end and said translatable means includes a reciprocable part having offset end portions, one of said offset end portions engaging said opening in said lever means to effect a connection therebetween.

6. An apparatus as defined in claim 5, wherein said oscillatable output member has an opening and the other offset end portion of said reciprocable part engaging said opening in said output member to effect a connection therebetween.

7. An apparatus as defined in claim 3, wherein said translatable means includes a rigid reciprocable part.

8. An apparatus as defined in claim 3, further including means for supporting said apparatus on the power takeoff unit.

9. An apparatus for actuating a power takeoff mechanism comprising a reversible motor energizable by an electrical system of a vehicle, said motor having an oscillatable output shaft, linkage means for transmitting power between said shaft and the power takeoff mechanism, said linkage means including an oscillating part connected to said shaft and a translatable part connected to said oscillatable part and to the power takeoff unit to engage the power takeoff unit when said translatable part is moved in one direction and to disengage the power takeoff unit when moved in the opposite direction, wherein said oscillatable part comprises a first link secured at one end to said shaft and said translatable part comprises a second link having offset end portions, one of said end portions being connected to said first link and the other of said end portions being connected to said first link and the other of said end portions being connected to a shiftable lever of the power takeoff mechanism.